United States Patent [19]

Beck

[11] 4,375,148
[45] Mar. 1, 1983

[54] MOWER BLADE

[76] Inventor: Carl E. Beck, 670 Merritt Dr., Mobile, Ala. 36609

[21] Appl. No.: 339,773

[22] Filed: Jan. 15, 1982

[51] Int. Cl.³ .......................................... A01D 55/18
[52] U.S. Cl. ................................................. 56/295
[58] Field of Search ........................................ 56/295

[56] References Cited

U.S. PATENT DOCUMENTS 3,563,015 2/1971 Renfroe ................................ 56/295
3,665,692 5/1972 Hughes ................................ 56/295

FOREIGN PATENT DOCUMENTS 265864 3/1966 Australia ............................... 56/295

*Primary Examiner*—Jay N. Eskovitz
*Attorney, Agent, or Firm*—Berman, Aisenberg & Platt

[57] ABSTRACT

An improved blade for a rotary lawn mower includes cutting elements which are removably attached to a base member. The removable elements may be made of a higher quality steel than the base member and may be easily removed for sharpening or merely replaced with a new element. A removable element is held in the base member by means of a wedged slot which cooperates with a wedged part of the shank of the removable cutting element, while a notch in the base member serves to hold the back of the blade.

11 Claims, 4 Drawing Figures

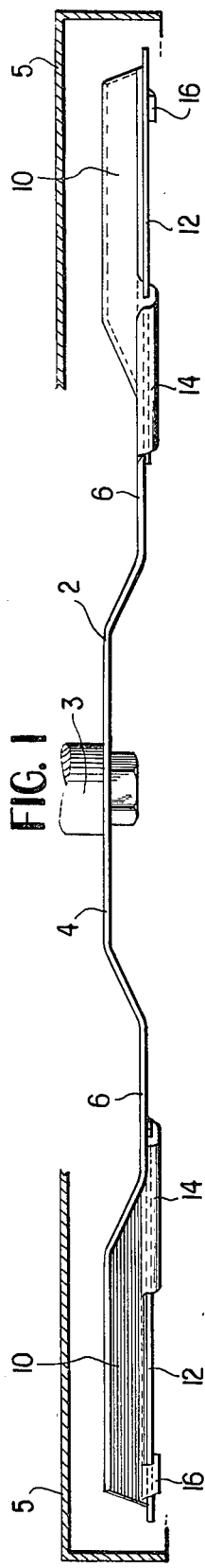
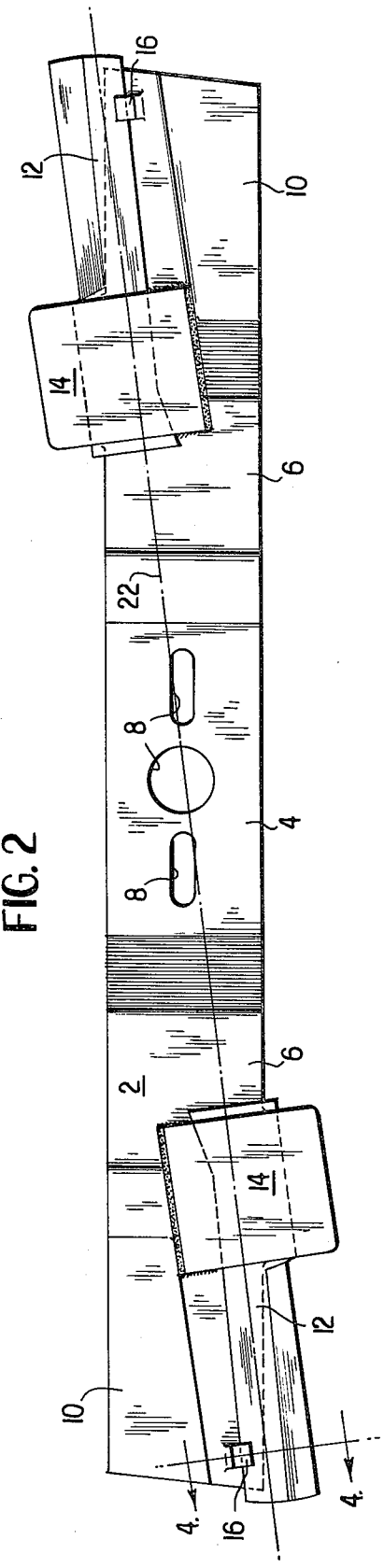
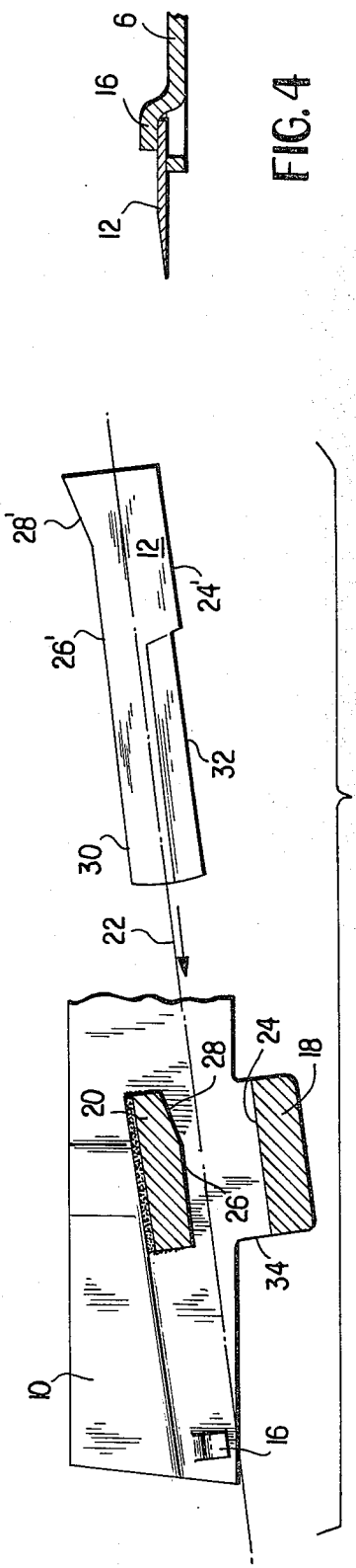

MOWER BLADE

THE TECHNICAL FIELD

This invention relates to cutting elements, particularly elements for use with a rotary lawn mower for cutting grass.

BACKGROUND ART

Rotary lawn mowers, having a blade rotated in a generally horizontal plane, about a central, generally vertical rotatable shaft, are known. The blade of such a lawn mower is a generally flat elongated piece of steel which is rotationally symmetric with the rotatable shaft. The blade has a sharpened edge on the leading edge of the outer portion of the blade. The outer portion trailing edge is generally slightly raised to cause a fan effect so as to lift the grass and to blow the clippings into a bag.

The cutting edge of a prior art mower blade becomes dull very quickly. While the mower blade appears to be cutting for a long period of time, in actuality the cutting edge may have ceased to be a true cutting edge and may thus sever blades of grass only because the mower blade is rotating very fast. Thus, the blades of grass are broken by the spinning mower blade and are bruised in the process. The grass develops a brown tip because of the bruising, has an unpleasing appearance, and is a damaged plant. Furthermore, since the dull mower blade must break the grass blades instead of cutting them, the motor which rotates the blade is under an increased load, thus requiring more maintenance and consuming more fuel.

Sharpening a mower blade entails removing the entire blade, grinding or filing a new edge on the blade, and remounting the blade. This procedure is difficult and time consuming.

STATEMENT OF THE INVENTION

The invention overcomes the disadvantages of the prior blade by providing a cutting element which is easily removed and replaced and may be of high quality steel.

The invention has as one of its objects the provision of elements having sharp cutting edges which may be easily attached to a rotating base element, and may be easily removed for sharpening or replacing.

This and other objects of the invention are accomplished by fixing a yoke to a base member which is adapted to be secured to a rotating shaft. The yoke provides a slot into which a cutting element is inserted and retains the cutting element in a given radial position. The slot has surfaces which cooperate with surfaces on the cutting element so that the centrifugal force due to rotation of the base member urges the cutting element more tightly into the slot. A notch is provided to support a part of the cutting element which is spaced from the yoke.

The cutting element has a sharp cutting edge and is made of a high quality steel which will hold a sharp edge. The shank of the cutting element is generally wedge shaped so that the centrifugal force of the rotation will urge the wedged shank into the wedged slot of the base member.

The replacement cutting elements of the invention greatly increase the efficiency of prior art lawn mowers; grass is cut more cleanly, and the load on the engine is reduced. When the cutting elements become dull, they may be easily removed by tapping them toward the center of rotation to release the wedge connection and then lifting the cutting element out of the slot. This operation can even be accomplished easily by people who are not mechanically adept; it requires no wrenches or tools other than a small hammer.

Furthermore, since the invention may use a prior art rotary mower blade as the base member, the invention can be economically constructed as a simple modification of an easily available item.

BRIEF DESCRIPTION OF THE DRAWINGS

FIG. 1 is an elevation view of a lawn mower having a blade according to the invention.

FIG. 2 is a bottom plan view of the invention.

FIG. 3 is an exploded view of one end of the blade according to the invention showing the cutting element and a cross section of the yoke.

FIG. 4 shows a cross section of the cutting element and a notch which supports the cutting element taken along line 4—4 of FIG. 2.

DETAILED DESCRIPTION OF THE INVENTION

FIG. 1 shows an elevation view of the mower blade according to the invention mounted on a prior art mower. A base member 2 has a central region 4 which is recessed relative to peripheral region 6. The rotatable shaft 3 is fixed to the blade in the central region 4. The base member 2 is adapted to be mounted on a rotating shaft by means of mounting holes and slots 8, shown in FIG. 2. The base member, as known in the art, includes raised portions 10 on the outer part of the peripheral region 6 for producing a flow of air to make the grass which is to be cut stand vertical. The blade rotates within a housing 5 which is shown diagrammatically.

The cutting element of the invention is more clearly shown in FIGS. 2 and 3. FIG. 2 shows the removable cutting element 12 secured to the base member 2. The means for securing the cutting element to the base member includes a yoke 14 and a clip 16.

FIG. 3 shows how the cutting element 12 is inserted into the yoke 14 and the clip 16. The yoke 14 is shown in cross section to include a first block 18 and a second block 20. The blocks 18, 20 provide surfaces which form a wedge for cooperating with surfaces on the cutting element shank and will be described in more detail below.

FIG. 4 shows a cross section of the clip 16. The clip 16 may be welded to the peripheral region 6 of the base member or, as shown in FIG. 4, may be pressed from the material of the base member so as to form a notch for securing the back of the cutting element.

The orientation of the various surfaces of the yoke and the cutting element are best described with respect to a reference line 22 which is a radius of rotation of the base member 2. The yoke 14 provides inner surfaces which act to hold the cutting element. The surface 24, on the block 18 is a generally flat surface and is parallel to the reference line 22. The surface 24 cooperates with edge 24' on the shank of the cutting element. The block 20 provides two surfaces 26 and 28. Surface 26 is generally flat and is preferably inclined at a 1° angle with respect to the reference line 22. Surface 26 cooperates with a portion 26' located on the back edge of the shank of the cutting element. The surface 26 and portion 26' may be parallel to the reference line 22, but experience has shown that having a slight angle provides a secure fit for the cutting element 12 and yet allows for easy removal of the cutting element 12 from the yoke 14. The surface 28 is also a flat surface and is inclined with respect to the reference line 22 at about 15°. A portion 28' of the back edge of the shank of the cutting element cooperates with the surface 28. The cutting element has a cutting edge 32.

The cutting element 12 has a center line which is generally coincident with the reference line 22 when the cutting element is secured in the yoke. Thus, the surfaces 26', 28' and 24' have the same relationships with regard to the center line of the cutting element and each other, as do surfaces 26, 28 and 24 with respect to reference line 22 and each other. In FIG. 3 the cutting element is shown having its center line coincident with the reference line 22.

The surfaces 26 and 28, and the cooperating surfaces 26' and 28' may also be a single planar surface having about a 5° to 8° angle with respect to the reference line.

The outer portion 30 of the back edge of the cutting element 12 may have approximately a −3° inclination with respect to the reference line 22. This insures that the cutting element is secured tightly by the yoke and clip 16. It should be noted that the angular measurements have been expressed with the normal convention that angles produced by counterclockwise rotation are positive and angles produced by clockwise rotation are negative.

The invention is shown in the figures as a modification of a prior art rotary mower blade. It has been found that the replaceable cutting elements of the invention operate most efficiently when the center line of the cutting element is displaced about 8°-10° from the center line of the prior art mower blade. This orientation however may be varied according to the particular circumstances. In some instances the cutting edge 32 should be curved instead of straight.

The edge 24' on the shank of the cutting element is shown in FIGS. 2 and 3 slightly displaced from the cutting edge 32. It should be noted that this displacement is not necessary since the primary purpose of the displacement is to allow the knife to clear the mounting bolt of the base member when being removed.

The invention has been shown using a single clip 16 for each cutting element. Some commercial uses may require more than one clip to provide additional strength to the mounting. Thus, one or more clips 16 may be employed. The clips 16 may be welded or riveted to the base member, pressed out of the base member material as shown in FIG. 4, or attached by any other convenient method.

The replaceable cutting elements of the invention may be used on a variety of base members. For some uses the blade may be flat instead of recessed, since the recessed feature is primarily for the purpose of allowing the cutting elements to slide past the mounting bolt, and the dimensions of the base member may be such that the recess is not necessary. It should also be noted that in some instances the raised portions 10 may be eliminated, such as for example where it is not necessary to create the fan effect.

The cutting element may be of a high quality steel which is capable of holding a very sharp edge. The base member may then be less expensive steel since it need only be strong enough to support the cutting element and does not need to have a cutting edge, as does a prior art blade.

The yoke shown in the figures may be constructed by attaching an extension 34 to a prior art mower blade and welding block 20 to the prior art blade and block 18 to the extension 34. A cap is then placed to span the blocks 18 and 20 and to form a slot. Of course, any number of construction techniques may be used to produce the yoke 14.

In a particular embodiment, the cutting element is 5⅜ inches in length and about 1¼ inches in width. The edge 24 of the shank of the cutting element is about 2⅛ inches long while the surface 28' is about an inch in length. When two cutting elements, such as these, are attached to a standard 20¼ inch rotary mower blade in the manner described, a very efficient and effective cutting blade is produced.

What is claimed is:
1. A blade for a rotary mower having a shaft which is rotatable in a fixed direction, the blade comprising:
   (a) a base member
   (b) means for removably mounting the base member on the rotatable shaft, and
   (c) means for removably securing cutting means to said base member so that a cutting edge extends from the base member in the direction of rotation of the rotatable shaft, the securing means comprising (a) a yoke fixed to said base member and forming a slot for receiving a shank of said cutting means and (b) clip means fixed to said base member and forming a notch for receiving a first edge of said cutting means.
2. Apparatus of claim 1 wherein said yoke includes:
first and second generally planar surfaces which provide means for securing opposed edges of said shank therebetween.
3. Apparatus of claim 2 wherein said second surface comprises a first and second generally planar portions which form an angle between them.
4. Apparatus of claim 3 wherein said first surface lies in a plane which is parallel to a radius of rotation of said base member when said base member is fixed to said shaft.
5. Apparatus of claim 4 wherein said first generally planar portion lies in a plane which forms approximately a one degree angle with respect to said radius of rotation of said blade, and said second generally planar portion lies in a plane which forms approximately a fifteen degree angle with said radius of rotation.
6. Apparatus of claim 5, in combination, with,
said cutting means, having a cutting edge, a back edge, and a shank,
said cutting edge and back edge being opposite each other and adjacent said shank,
said shank being located in said yoke and having surfaces which cooperate with said first and second surfaces to secure said cutting means in said yoke during rotation of said blade.
7. Apparatus of claim 6 wherein said back edge has a surface which lies in a plane forming approximately a three degree angle with a center line of said cutting means.
8. Apparatus of claim 7 wherein said center line is coincident with said radius of rotation.
9. Apparatus of claim 1, 6 or 8, in combination with a rotary lawn mower having said rotatable shaft and wherein said blade is fixed to said shaft.
10. A blade for a rotary mower, having a shaft which is rotatable in a predetermined direction, the blade comprising:

(a) a base member
(b) means for mounting said base member on said rotatable shaft, and
(c) means for removably securing cutting means to said base member, the securing means comprising a yoke which is fixed to said base member and forms a slot for receiving a shank of said cutting means, said yoke having first and second facing surfaces for engaging opposed edge of said shank, said second surface having first and second angularly related generally planar portions.

11. The blade of claim 10 further comprising clip means fixed to said base member for supporting a first edge of said cutting means spaced from said shank.

* * * * *